(12) United States Patent
Gordon

(10) Patent No.: US 8,888,946 B1
(45) Date of Patent: Nov. 18, 2014

(54) DUAL-TIP STRAIGHT PIN AND METHOD OF USE

(76) Inventor: Michael Gordon, Delray Beach, FL (US)

( * ) Notice: Subject to any disclaimer, the term of this patent is extended or adjusted under 35 U.S.C. 154(b) by 131 days.

(21) Appl. No.: 13/412,185

(22) Filed: Mar. 5, 2012

Related U.S. Application Data

(63) Continuation-in-part of application No. 12/404,817, filed on Mar. 16, 2009, now abandoned, which is a continuation-in-part of application No. 11/522,021, filed on Sep. 15, 2006, now abandoned.

(51) Int. Cl.
*B29C 65/48* (2006.01)
*F16B 15/00* (2006.01)
*B29C 65/78* (2006.01)

(52) U.S. Cl.
CPC ............ *B29C 65/7841* (2013.01); *B29C 65/48* (2013.01)
USPC ................ 156/305; 156/60; 411/470; 269/53

(58) Field of Classification Search
CPC .... B29C 65/48; B29C 65/56; B29C 65/7841; B29C 65/7855; F16B 12/24; F16B 19/921; Y10S 411/921
USPC .............. 411/457, 459, 470; 156/91, 60, 305; 269/53–54.5, 287, 288, 289 R, 290, 293
See application file for complete search history.

(56) References Cited

U.S. PATENT DOCUMENTS

| | | | |
|---|---|---|---|
| 65,497 A | 6/1867 | McGill | |
| 319,607 A * | 6/1885 | Nelson | ........................... 411/470 |
| 339,769 A | 4/1886 | Hayes | |
| 356,202 A | 1/1887 | Kempshall | |
| 392,302 A | 11/1888 | Ballou | |
| 1,001,529 A | 8/1911 | Jonah | |
| 1,264,238 A | 4/1918 | Whetstone | |
| 1,295,811 A * | 2/1919 | Stidham et al. | ................ 411/470 |
| 1,422,148 A | 7/1922 | Tonkin | |
| 1,639,072 A | 8/1927 | Betz | |
| 1,983,373 A | 12/1934 | Horton | |
| 2,887,004 A | 5/1959 | Stewart | |
| 3,339,448 A * | 9/1967 | McKee | .......................... 411/473 |
| 3,693,496 A | 9/1972 | Koide | |
| D376,443 S | 12/1996 | Porter | |
| 6,593,213 B2 * | 7/2003 | Stanbery | ........................ 438/478 |
| 6,761,783 B2 * | 7/2004 | Keller et al. | ..................... 156/94 |

* cited by examiner

*Primary Examiner* — John Goff
*Assistant Examiner* — Scott W Dodds
(74) *Attorney, Agent, or Firm* — H. John Rizvi; Gold & Rizvi P.A.

(57) ABSTRACT

A dual-tip straight pin is disclosed. The pin includes a main shaft having a first tip and a pin leg extending from the main shaft, having a second tip. The pin is suitable for temporarily retaining a plurality of assembly components, such as wood, cloth and the like, to an assembly support workstation retaining the plurality of assembly components in a precisely aligned relationship to each other. The main shaft is located proximate a first side of the assembly component. The first tip extends beyond the second tip enabling the user to insert the main shaft into the workstation and use the main shaft as a pivot to position the pin leg against the second side of the assembly component. The pin is inserted into the assembly support workstation to a depth where a transverse segment of the pin leg engages with an upper surface of the assembly component.

9 Claims, 14 Drawing Sheets

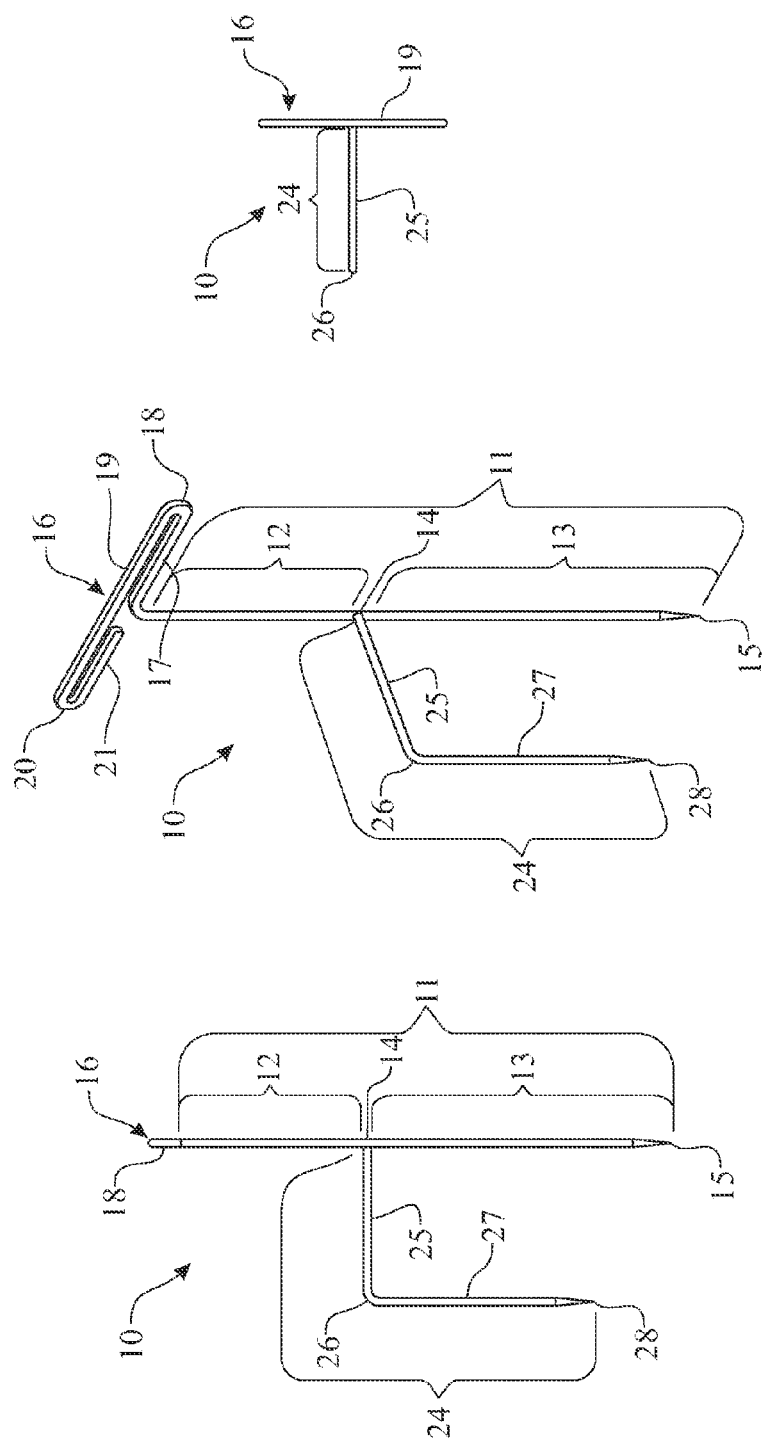

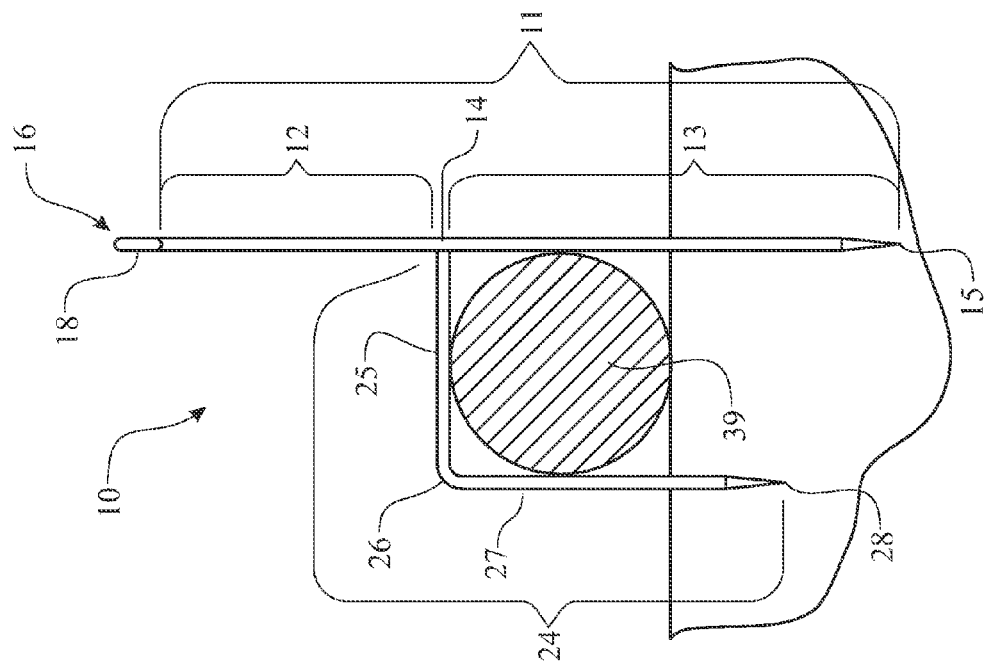
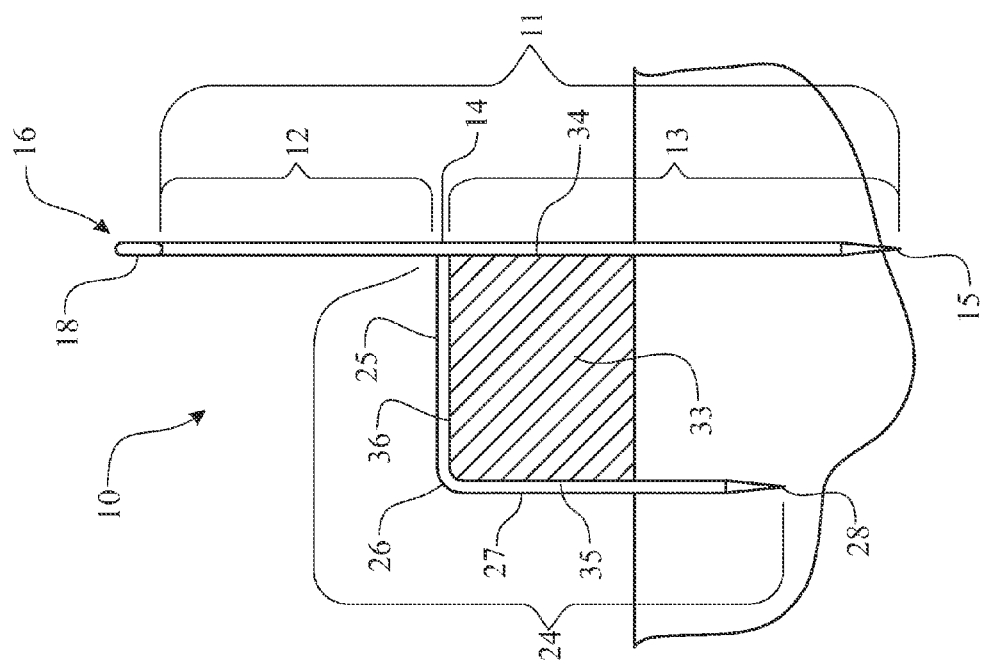

DUAL-TIP STRAIGHT PIN AND METHOD OF USE

CROSS-REFERENCE TO RELATED APPLICATIONS

This application is a Continuation-In-Part and claims the benefit of co-pending U.S. Continuation-In-Part patent application Ser. No. 12/404,817, filed Mar. 16, 2009, which claims the benefit of U.S. Non-Provisional patent application Ser. No. 11/522,021, filed Sep. 15, 2006, which are incorporated hereto in their entirety.

FIELD OF THE INVENTION

The present invention relates to straight pins. More particularly, the present invention relates to a method of using a dual-tip straight pin that is characterized by enhanced fastening capability and is suitable for temporarily retaining a plurality of components of an assembly or subassembly in a precisely aligned relationship to each other during a gluing process.

BACKGROUND OF THE INVENTION

Straight pins are commonly used to hold strips of wood, cloth or other material to an assembly support workstation such as a corkboard or other support base material as the strips of material are glued or adhered to each other. For example, straight pins are commonly used to hold pieces of balsa wood adjacent to each other in order to enable gluing of the pieces together in the construction of models. A typical conventional straight pin has a straight shaft the lower end of which terminates in a sharp tip. An elongated, flat or spherical pinhead is provided on an upper end of the shaft to facilitate manual insertion of the pin into an assembly support workstation in the pinning of fabric or other material to an upper surface of the assembly support workstation. Some straight pins are fitted with a T-handle to facilitate extending the tip of the pin into harder substances such as balsa wood.

The use of conventional straight pins to secure strips of material in aligned relationship to each other on an assembly support workstation, such as for the purpose of gluing the strips to each other, for example, is attended by several disadvantages. For example, after glue is applied to each piece of the material and the pieces of material properly aligned with each other and placed against each other on the assembly support workstation, the multiple pins must typically be extended into the assembly support workstation at an angle on each side of the piece of material, with the shaft of each pin engaging a corresponding edge of the piece of material, to hold the material in place while the glue dries. This is cumbersome since multiple pairs of the pins must typically be pinned in place at spaced intervals along the material, presenting the risk that the two pieces of material be inadvertently moved out of alignment with respect to each other.

Therefore, a novel straight pin with enhanced fastening capability is needed to facilitate ease and precision in securing pieces of material to an assembly support workstation and maintaining precise alignment of the pieces of material with respect to each other as the pieces of material are typically glued to each other.

SUMMARY OF THE INVENTION

The present invention is generally directed to a novel straight pin which facilitates ease and precision in securing two pieces of material to an assembly support workstation in precisely aligned relationship with respect to each other as the pieces of material are typically glued to each other.

In one aspect of the present invention, a straight pin is provided having a pair of spaced-apart tips which are inserted into an assembly support workstation in spaced-apart relationship to each other typically on opposite sides of a piece of material in order to facilitate securing the piece of material to the assembly support workstation.

In another aspect of the present invention, a straight pin with enhanced fastening capability having a pinhead to facilitate extending the pin into a solid or semi-solid assembly support workstation is provided.

In still another aspect of the present invention, the straight pin with enhanced fastening capability includes a main shaft having a sharp tip and a pin leg that extends from the main shaft and terminates in a second sharp tip.

In yet another aspect of the present invention, the straight pin with enhanced fastening capability is capable of pinning adjacent strips of material to an assembly support workstation in aligned relationship to each other to facilitate gluing of the strips of material to each other.

In a still further aspect of the present invention, the straight pin with enhanced fastening capability is suitable for use with strips of material having a variety of shapes.

In yet another aspect of the present invention, the straight pin with enhanced fastening capability is capable of pinning strips of material having various widths to an assembly support workstation.

In still another aspect of the present invention, the straight pin with enhanced fastening capability is suitable for pinning strips of wood, plastic, cloth or other material to an assembly support workstation in aligned relationship to each other.

In yet a further aspect of the present invention, the straight pin with enhanced fastening capability facilitates ease and precision in securing major pieces in precise alignment over a full size plan and subsequently securing additional pieces to the major pieces precisely aligned on the plan.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 3 presents a side view of the dual-tip straight pin originally introduced in FIG. 2;

FIG. 4 presents a front isometric view of the dual-tip straight pin of FIG. 2;

FIG. 5 presents a top view of the dual-tip straight pin of FIG. 2;

FIG. 6 presents a side view of the dual-tip straight pin, inserted in an assembly support workstation securing a strip of rectangular cross-sectioned material to the assembly support workstation in typical application of the pin;

FIG. 7 presents a side view of the dual-tip straight pin, inserted in the assembly support workstation securing a strip of circular cross-sectioned material to the assembly support workstation in typical application of the pin;

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is generally directed towards a dual-tip straight pin which provides an enhanced fastening capability and is suitable for temporarily retaining strips of material to an assembly support workstation with the strips of material disposed in a precisely aligned relationship to each other. The strips of material can be wood, plastic, cloth, and the like, or any combination thereof.

Figure 2:
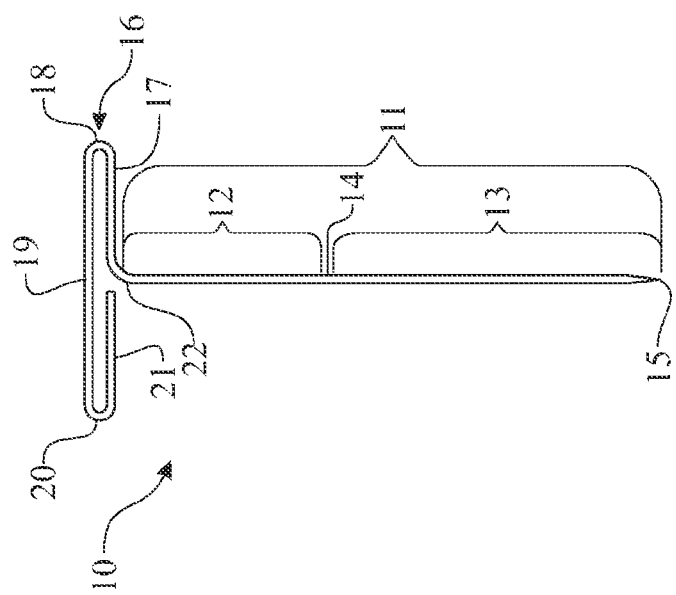
FIG. 2 presents a front view of a first exemplary embodiment of a dual-tip straight pin wherein the dual-tip feature provides an enhanced fastening capability in accordance with the present invention.
Figure 1:
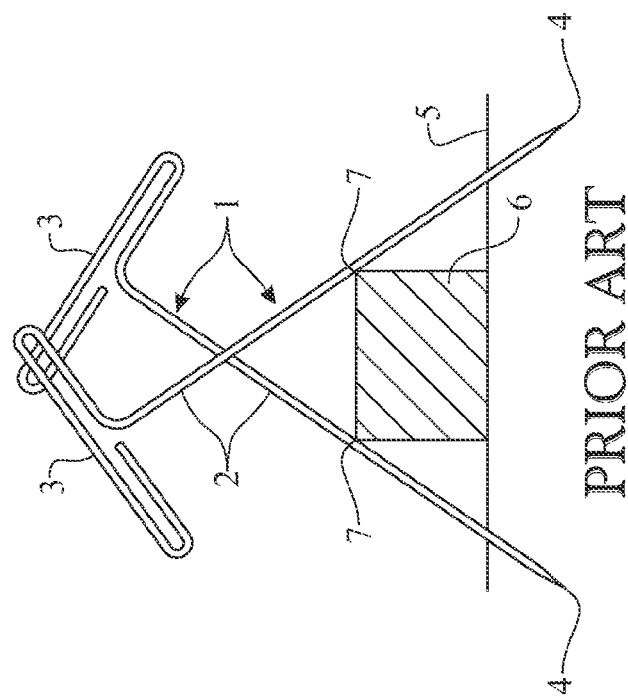
FIG. 1 presents a cross-section of a strip of material pinned to an assembly support workstation using a pair of conventional straight pins in accordance with known prior art.

A pair of illustrative conventional straight pins 1 used to temporarily retain a section of material 6 upon an assembly support workstation 5 in accordance with the known technology is illustrated in FIG. 1. Each conventional straight pin 1 typically includes a single elongated material shaped into an elongated shaft 2 extending generally perpendicular from a T-handle 3. The T-handle 3 is formed at the upper end. A lower end of the shaft 2 is processed forming a sharpened tip 4. A series of sections of material 6 are placed upon a top surface of the assembly support workstation 5 in accordance with a predetermined plan layout. The pins 1 are inserted to temporarily secure each of the adjacent sections of material 6 in the desired position on the assembly support workstation 5 An adhesive material, such as glue, epoxy, and the like, is applied to each joint formed between each adjacent section of material 6. The assembly is set aside until the adhesive material is cured. Once the adhesive material is cured, the pins 1 are removed from the assembly and the assembly is removed from the assembly support workstation 5.

The process has limitations. The pins are placed at an angle. During the insertion process, the it is highly probably that the angled relation of the pin may cause the section of material 6 to undesirably move, resulting in misalignment of the sections of material 6. Furthermore, contact of the pins 1 with corners of the section of material 6, particularly in the case of soft material such as balsa wood, will most likely deform the section of material 6 if an effective grip is to be obtained. The angled insertion of the pins 1 result in an extremely small contacting surface area. The small contact area hinders the control the pins 1 have on securing the section of material 6 in position.

A first exemplary embodiment of a dual-tip straight pin 10 is presented in FIGS. 2 through 5. It should be appreciated by those skilled in the art that in the present invention, the material is most frequently aligned and secured to a plan and, only when this step has been successfully completed, are the various pieces glued together.

The dual-tip straight pin 10 is typically fabricated of steel, copper, brass, or any other suitable metal or material. The dual-tip straight pin 10 is designed, including an elongated main shaft 11. The main shaft 11 is defined having a main shaft upper segment 12, a main shaft lower segment 13 and a main shaft midsection 14 located therebetween. An operative handle is provided at an upper end of the main shaft 11. In the first exemplary embodiment, the handle is a T-handle 16. The T-handle 16 may be formed by shaping the upper end of the main shaft 11, as shown, or alternatively, may be fabricated as a separate member and attached to the main shaft 11. When integrally shaped, the T-handle 16 may include a handle bend 22 (FIG. 2) in the upper end of the main shaft upper segment 12, a proximal segment 17 extending from the handle bend 22 generally perpendicular to the main shaft 11, a proximal bend 18 formed as a 180 degree bend extending from the proximal segment 17 disposed in a parallel relationship to the main shaft 11, a main segment 19 extending from the proximal bend 18 disposed in generally parallel relationship to the proximal segment 17, a distal bend 20 extending from the main segment 19 disposed in a generally parallel relationship to the main shaft 11, and a distal segment 21 extending from the distal bend 20 and disposed in generally parallel relationship to the main segment 19 and preferably linear relationship with the proximal segment 17. It is understood that other handle configurations (not illustrated) can be utilized as the handle. The alternative configurations can include any designs, including flat handles, ball-shaped handles, and the like can be employed. A sharpened main shaft tip 15 terminates the lower end of the main shaft lower segment 13 of the main shaft 11.

Figure 20:
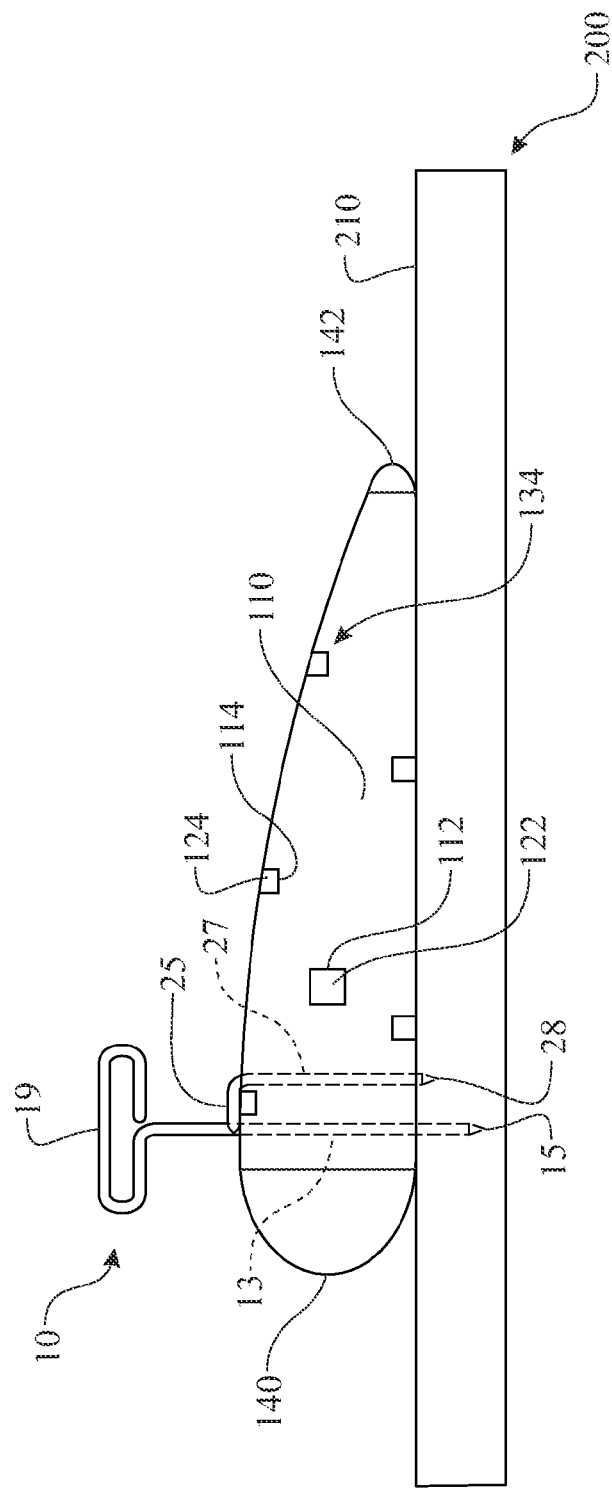
FIG. 20 presents a side view of the exemplary section of a model airplane, as presented in FIG. 16, illustrating a curing step of the assembly process.

As best depicted in FIGS. 3 and 4, a pin leg 24 extends from the main shaft 11. The pin leg 24 may include a transverse segment 25 which extends from the main shaft 11, typically at or near the main shaft midsection 14 located between the main shaft upper segment 12 and the main shaft lower segment 13 of the main shaft 11. The transverse segment 25 may be disposed in generally perpendicular relationship to the longitudinal axis of the main shaft 11. A descending segment 27 extends from the transverse segment 25 at a leg bend 26. The descending segment 27 may be disposed in generally perpendicular relationship to the transverse segment 25 and in generally parallel relationship to the main shaft lower segment 13 of the main shaft 11. A sharpened descending segment tip 28 terminates the lower end of the descending segment 27 of the pin leg 24. Preferably, the main shaft lower segment 13 of the main shaft 11 extends beyond the descending segment tip 28 of the descending segment 27. As illustrated in FIG. 5, a longitudinal axis of the T-handle 16 may extend in generally perpendicular relationship to a longitudinal axis of the transverse segment 25 of the pin leg 24, or alternatively, may extend generally parallel to or at any other angle with respect to the transverse segment 25 as illustrated in FIG. 20.

Referring next to FIGS. 6 through 9 of the drawings, in typical use of the invention, the dual-tip straight pins 10 are typically used to secure an assembly component 33 such as wood, plastic, metal, and the like to an assembly support workstation 32. The assembly support workstation 32 can be fabricated out of a soft material such as a cork board, cardboard, balsawood, and the like to precisely hold a plurality of sections of assembly material 33 together in a predetermined pattern in order to adhesively join the sections of assembly material 33 together. Accordingly, the sharpened main shaft tip 15 and descending segment tip 28 of the dual-tip straight pin 10 are inserted in the assembly support workstation 32 wherein the transverse segment 25 straddles the assembly component 33. The dual-tip straight pin 10 is inserted into the assembly support workstation 32 placing the main shaft lower segment 13 adjacent to and preferably lightly contacting a first side surface 34 of the assembly component 33. The main shaft lower segment 13 is inserted into the assembly support workstation 32 to a sufficient depth enabling a pivotal motion of the dual-tip straight pin 10. The dual-tip straight pin 10 is rotated by gripping and applying a torque to the T-handle 16 until the descending segment 27 is adjacent to and preferably lightly contacts the second, opposite side surface 35 of the assembly component 33. Once rotated into the desired position, the insertion process of the dual-tip straight pin 10 resumes, inserting both the main shaft lower segment 13 and descending segment 27 into the assembly support workstation 32 until a lower surface of the transverse segment 25 lightly contacts an upper surface 36 of the assembly component 33. The process is repeated until the desired quantity of dual-tip straight pins 10 are inserted providing adequate support to each of the sections of assembly material 33 of the complete assembly. Each of the dual-tip straight pins 10 would be inserted at a strategic location to provide optimal support of each of the sections of assembly material 33. It is noted that the utilization of the dual-tip straight pin 10 provides significantly greater support than the pins 1 of FIG. 1. The prior art supports the material at a small corner. Conversely, the dual-tip straight pin 10 supports the assembly component 33 along a significantly greater distance, an as illustrated in FIG. 6 can be as long as the exposed portion of the descending segment 27, across the transverse segment 25, and along the exposed portion of the main shaft lower segment 13. It is noted that the dual-tip straight pin 10 provides a significant amount of contact area, particularly compared to the implementation of the straight pin 1 of the prior art.

An adhesive, such as glue, epoxy, and the like is applied to the ends or other intersecting segment of each mating pair of sections of assembly material 33 to adhesively secure the strips together, wherein the adhesive is applied either prior to or subsequent to placement of each of the sections of assembly material 33. Accordingly, the dual-tip straight pins 10 are effective to temporarily retain the sections of assembly material 33 in position on the assembly support workstation 32, preventing the sections of assembly material 33 from inadvertently moving away from the desired alignment with respect to each other while the adhesive cures. The dual-tip straight pin 10 provides a unique advantage over the prior art, wherein the dual-tip straight pin 10 provides support against lateral and vertical motion of the assembly component 33 using a single dual-tip straight pin 10 during a single insertion process. It will be appreciated by those skilled in the art that the dual-tip straight pins 10 can be used to secure strips having any cross-sectional configuration in alignment to each other on the assembly support workstation 32, such as a pair of aligned strips 39 each having a circular cross-sectional configuration to each other, for example, as illustrated in FIG. 7. It will be further appreciated by those skilled in the art that the dual-tip straight pin 10 will not easily loosen inadvertently from the assembly support workstation 32 since both the sharpened main shaft tip 15 and the descending segment tip 28 are embedded in the assembly support workstation 32.

Figure 8:
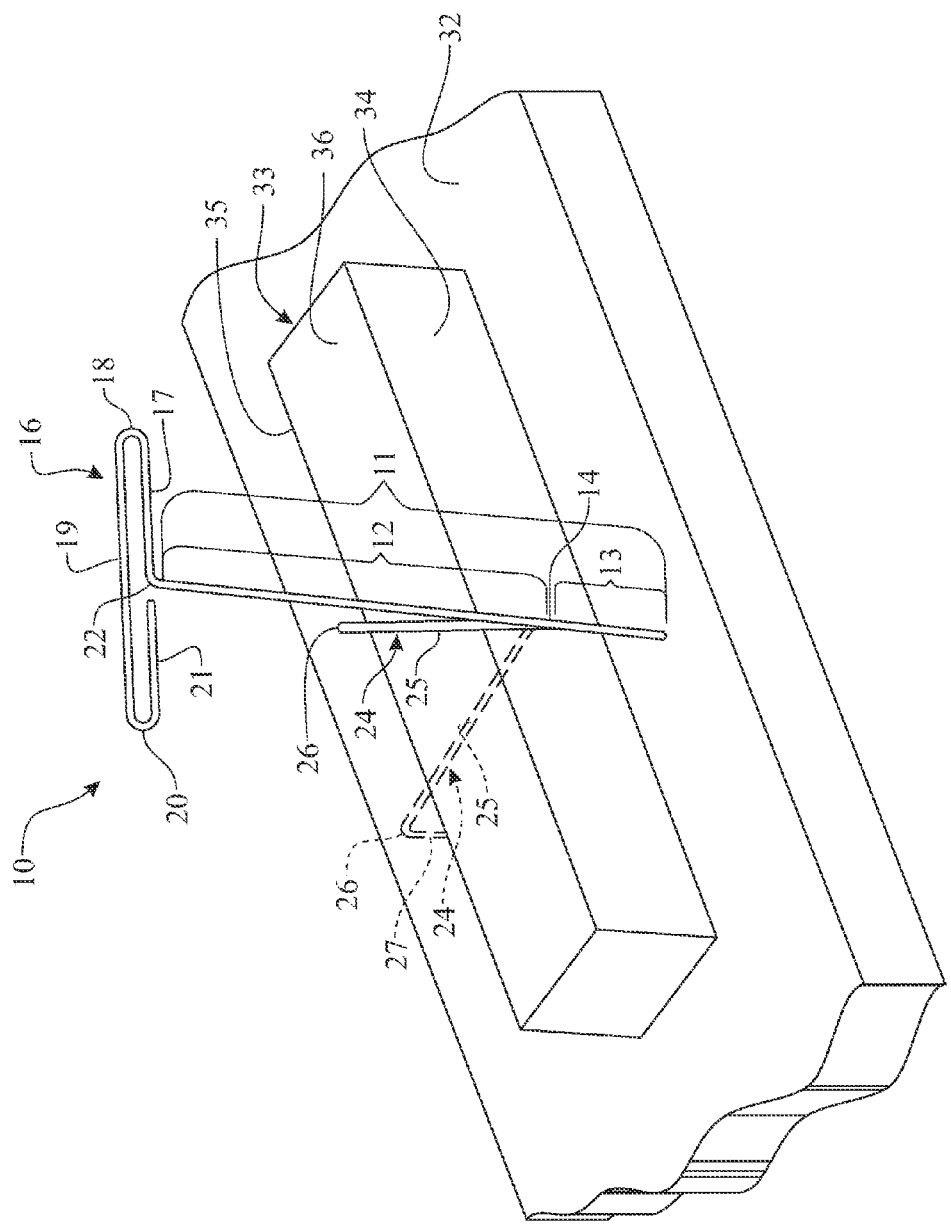
FIG. 8 presents a isometric view of the dual-tip straight pin, more particularly illustrating an exemplary method of securing of a strip of material having a relatively narrow width to the assembly support workstation.
Figure 9:
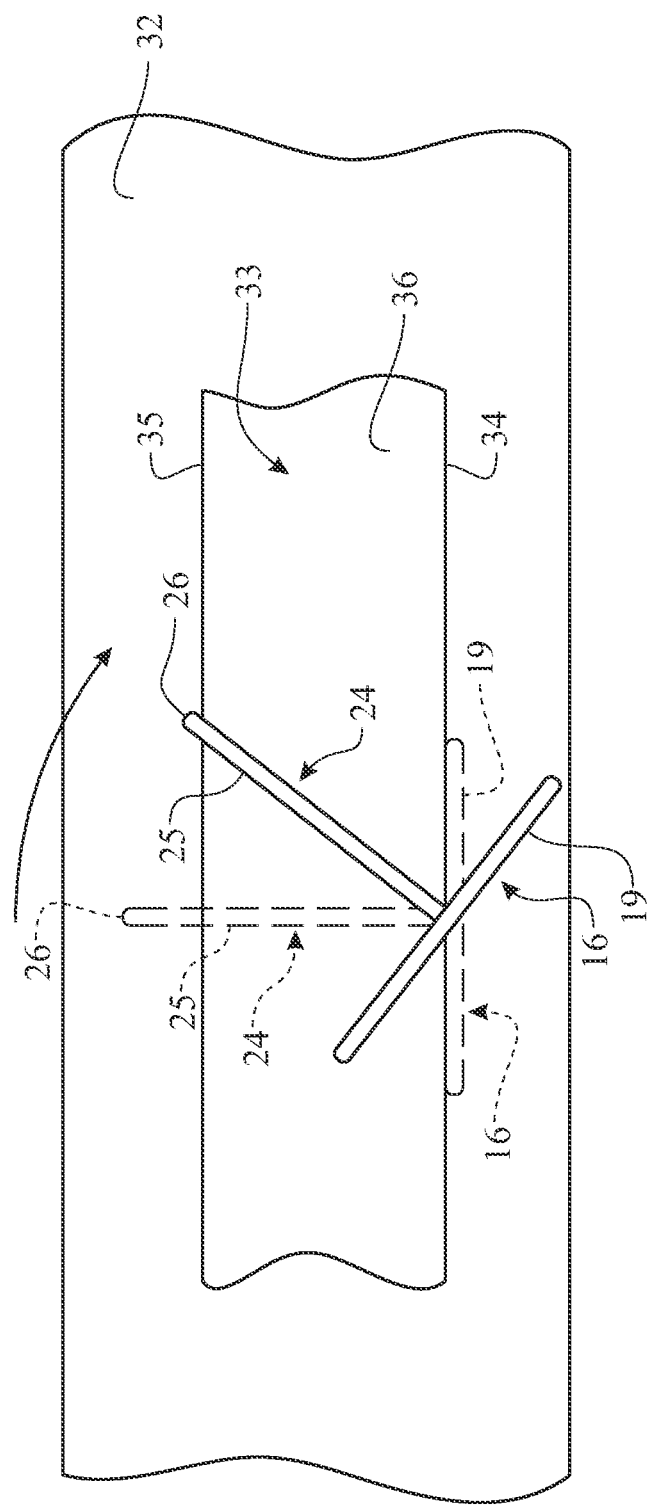
FIG. 9 presents a top view of the dual-tip straight pin, more particularly illustrating the method of securing of a strip of material having a relatively narrow width to the assembly support workstation, originally illustrated in FIG. 8.

In the event that assembly component 33 has a width that is greater than the distance between the main shaft 11 and the descending segment 27 on the pin leg 24 of each dual-tip straight pin 10, as illustrated in FIGS. 8 and 9, each dual-tip straight pin 10 is inserted into the assembly support workstation 32 typically as follows. The sharpened main shaft tip 15 of the main shaft 11 is initially inserted in the assembly support workstation 32, adjacent to the assembly component first side surface 34 of the assembly component 33, with the transverse segment 25 of the pin leg 24 initially extending across the assembly component upper surface 36 of the assembly component 33 and the descending segment 27 of the pin leg 24 extending adjacent to the assembly component second, opposite side surface 35 of the assembly component 33, as indicated by the phantom lines in FIGS. 8 and 9. It will be appreciated by those skilled in the art, that in the preferred embodiment, one leg of the dual-tip straight pin 10, preferably the main shaft 11 ending in segment tip 15, will be longer than the other leg, preferably the descending segment 27 of the pin leg 24 as shown throughout the figures. Having one leg longer than the other permits the dual-tip straight pin 10 to be precisely sized to the work piece by rotation of the dual-tip straight pin 10 prior to it being fully inserted into place.

Next, the dual-tip straight pin 10 is rotated about the longitudinal axis of the main shaft 11, in either a clockwise direction or a counterclockwise direction (the clockwise direction is shown in FIGS. 8 and 9), as indicated by an arrow illustrated in FIG. 9, until the descending segment 27 of the pin leg 24 lightly engages with the assembly component second, opposite side surface 35 of the assembly component 33, as indicated by the solid lines. The dual-tip straight pin 10 is then pushed downwardly such that the descending segment tip 28 on the descending segment 27 of the pin leg 24 extends downwardly into the assembly support workstation 32, continuing until the lower surface of the transverse segment 25 of the pin leg 24 engages with the upper surface 36 of the assembly component 33. Therefore, the dual-tip straight pins 10 are effective in securing the sections of assembly material 33 to the assembly support workstation 32 and in a desired relationship with each other as adhesive applied between the sections of assembly material 33 cures.

An alternative exemplary embodiment of the dual-tip straight pin 40 is illustrated in FIGS. 10 through 13. The dual-tip straight pin 40 may be similar in design to the dual-tip straight pin 10 which was heretofore described with respect to FIGS. 1 through 9, except in the dual-tip straight pin 40, the T-handle 16 of the dual-tip straight pin 10 is replaced by a pinhead 41 at a proximal end of the main shaft 11. The pinhead 41 of the dual-tip straight pin 40 may have a generally flat, planar configuration and the plane of the pinhead 41 may be disposed in generally perpendicular relationship with respect to a longitudinal axis of the main shaft 11. In some embodiments, the pinhead 41 may have a generally circular, disc-shaped configuration with a generally planar lower surface 42; a generally planar upper surface 44; and an annular side surface 43 extending between the lower surface 42 and the upper surface 44. In other embodiments, the pinhead 41 may have alternative shapes.

Figure 11:
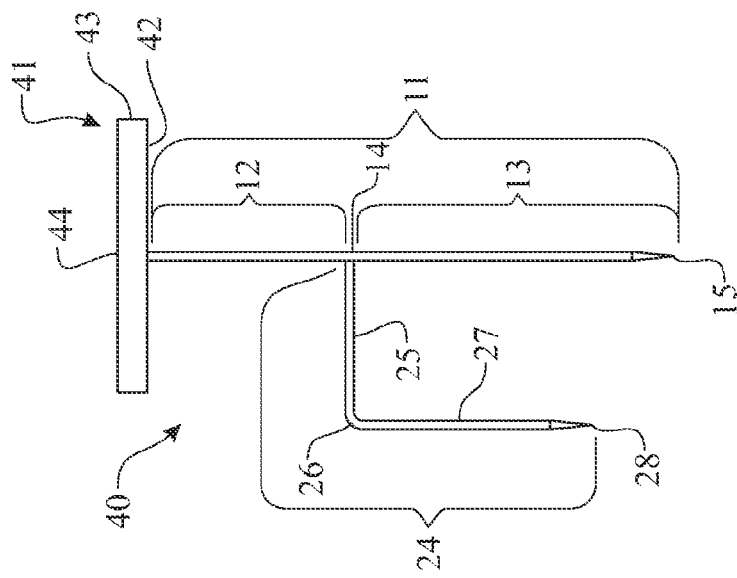
FIG. 11 presents a side view of the dual-tip originally introduced in FIG. 10.
Figure 10:
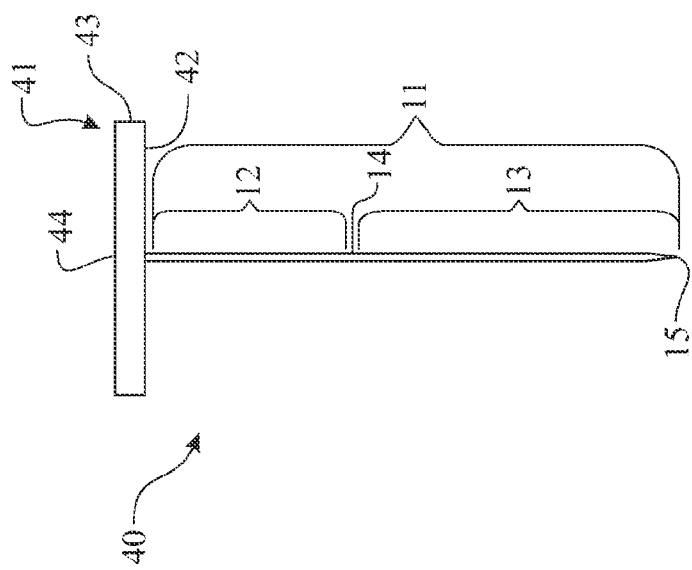
FIG. 10 presents a rear view of a second exemplary embodiment of a dual-tip straight pin.
Figure 13:
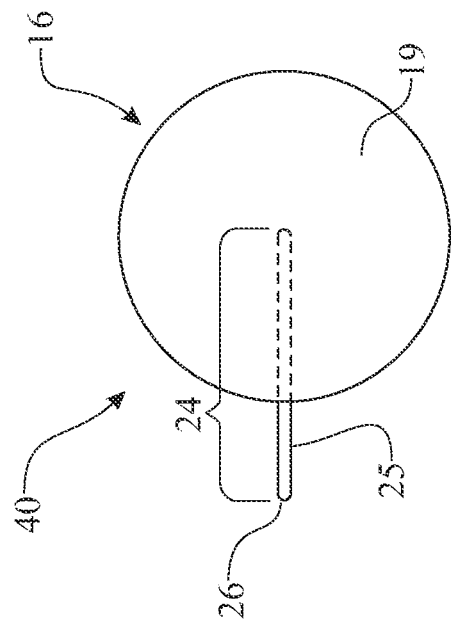
FIG. 13 presents a top view of the dual-tip straight pin of FIG. 10.
Figure 12:
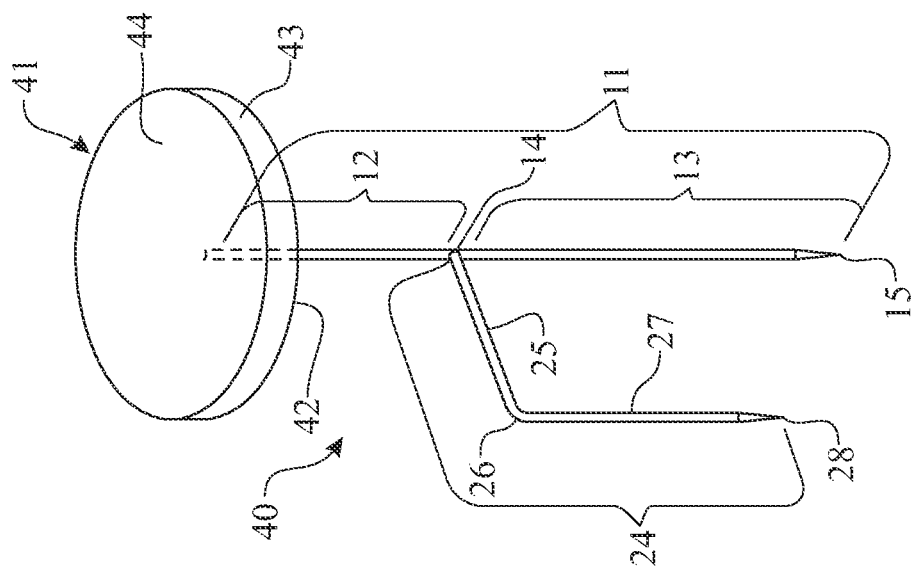
FIG. 12 presents a top isometric view of the dual-tip of FIG. 10.

The main shaft 11 of the dual-tip straight pin 40 may include a main shaft upper segment 12 which extends from the lower surface 42 of the pinhead 41 and a main shaft lower segment 13 which extends from the main shaft upper segment 12 and terminates in a sharpened main shaft tip 15. As illustrated in FIGS. 11 and 12, the pin leg 24 may include a transverse segment 25 which extends from the main shaft 11 at substantially the main shaft midsection 14 of the main shaft 11, between the main shaft upper segment 12 and the main shaft lower segment 13. The transverse segment 25 of the pin leg 24 may be disposed in generally perpendicular relationship with respect to the main shaft 11. The pin leg 24 may further include a descending segment 27 which extends from the transverse segment 25 in generally perpendicular relationship with respect to the transverse segment 25 and in generally parallel relationship with respect to the main shaft lower segment 13 of the main shaft 11. A descending segment tip 28 may terminate the descending segment 27. The sharpened main shaft tip 15 on the main shaft 11 and the descending segment tip 28 on the pin leg 24 may lie within a plane which is non-parallel with respect to the plane of the pinhead 41. In some embodiments, the sharpened main shaft tip 15 on the main shaft 11 may protrude beyond the descending segment tip 28 on the pin leg 24. Therefore, the descending segment 27 of the pin leg 24 may be shorter than the main shaft lower segment 13 of the main shaft 11.

Figure 14:
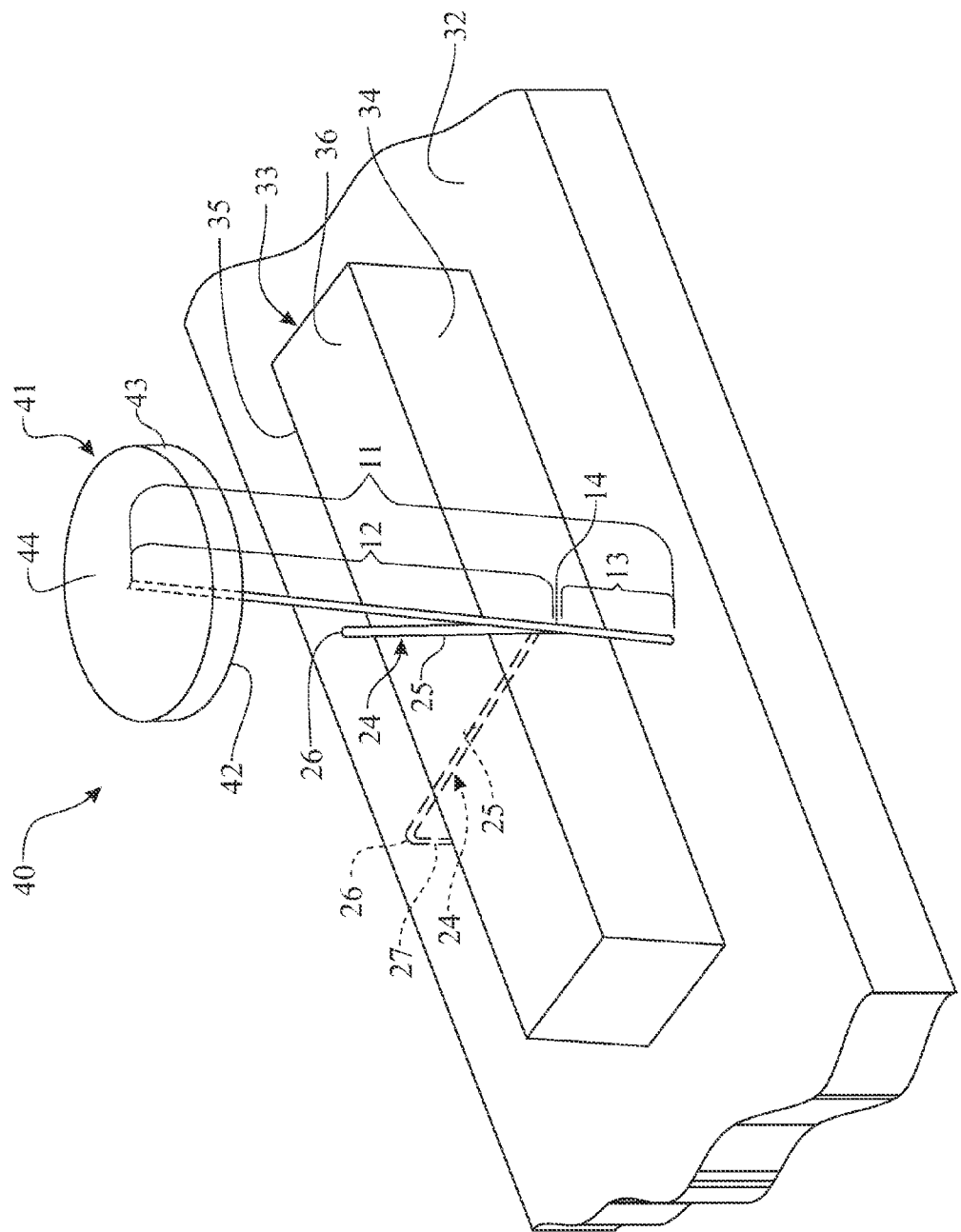
FIG. 14 presents an isometric view of the dual-tip straight pin, more particularly illustrating an exemplary method of securing of a strip of material having a relatively narrow width to the assembly support workstation.
Figure 15:
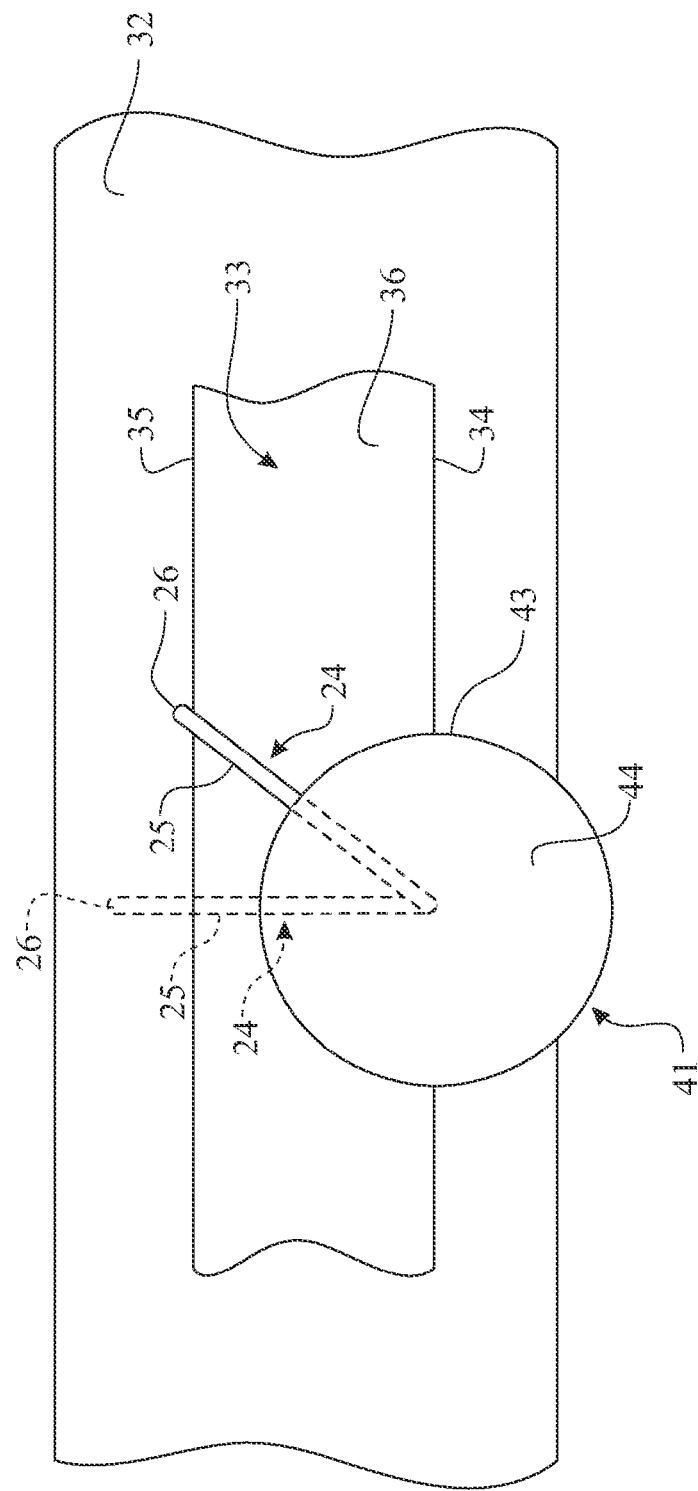
FIG. 15 presents a top view of the dual-tip straight pin, more particularly illustrating the method of securing of a strip of material having a relatively narrow width to the assembly support workstation, originally illustrated in FIG. 14.
Figure 16:
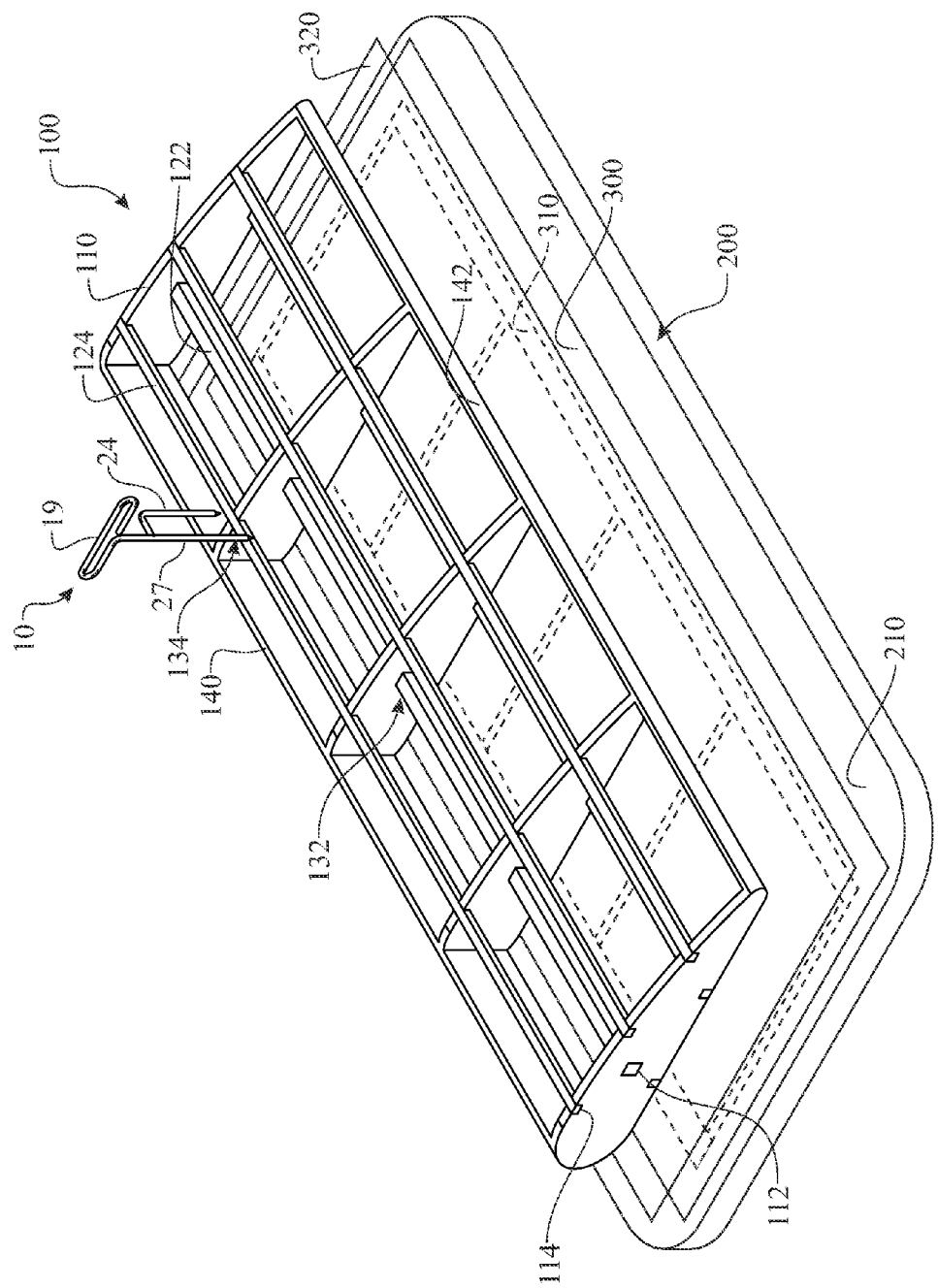
FIG. 16 presents an isometric view of an exemplary section of a model airplane illustrating a first step of installing the dual-tip straight pin for aiding in an assembly process.
Figure 17:
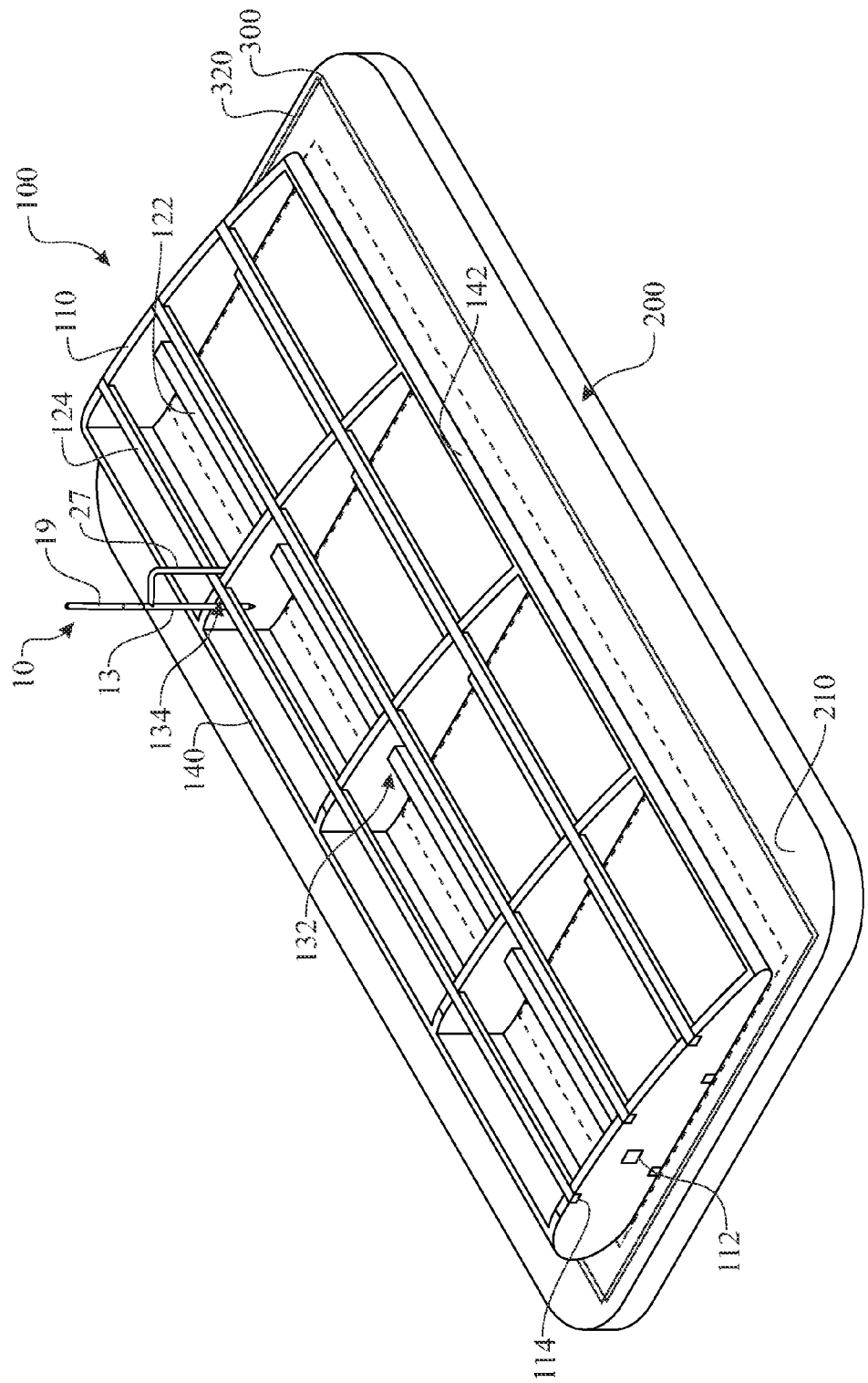
FIG. 17 presents an isometric view of the exemplary section of a model airplane, as presented in FIG. 16, illustrating a second step of installing the dual-tip straight pin for aiding in the assembly process.
Figure 18:
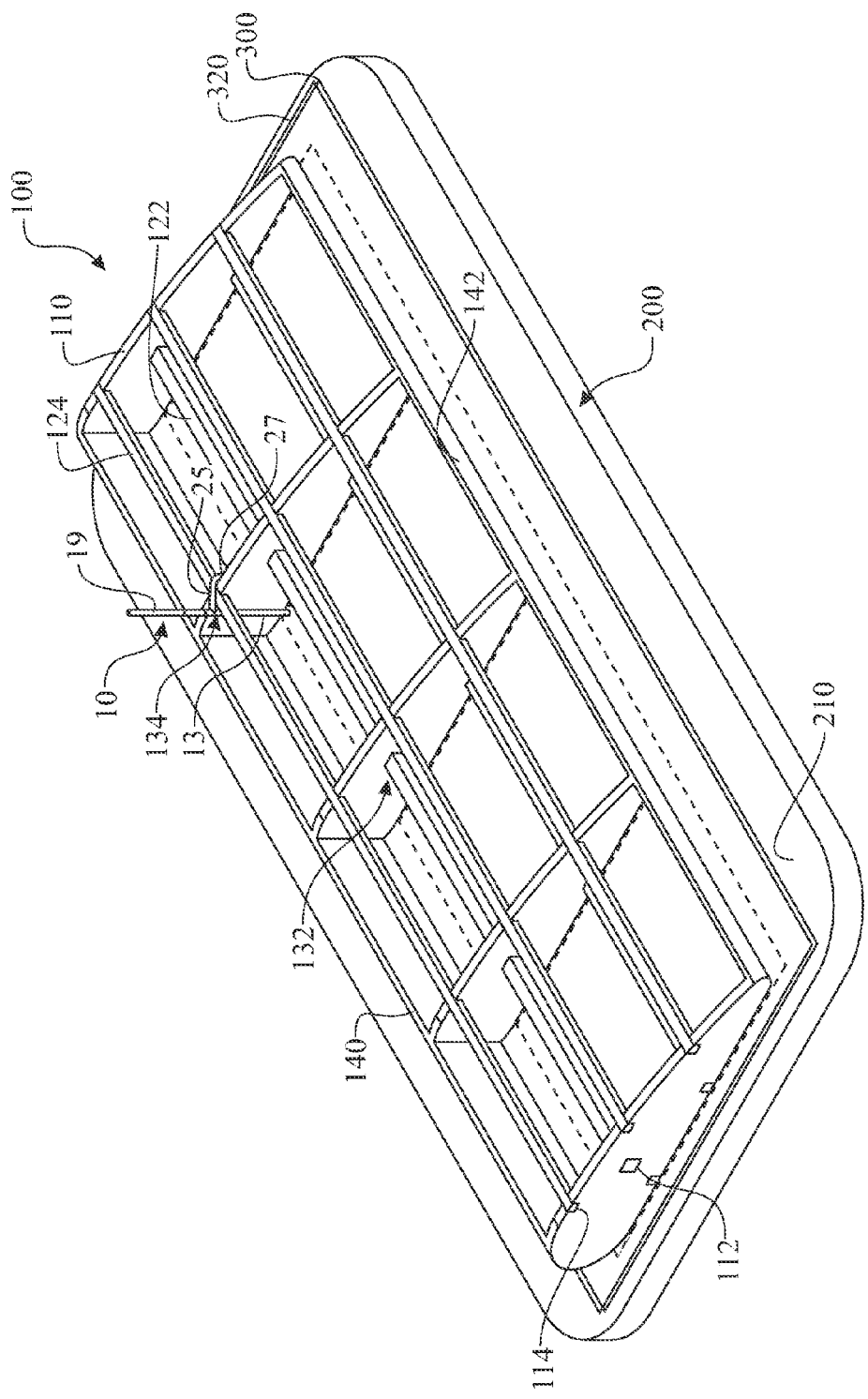
FIG. 18 presents an isometric view of the exemplary section of a model airplane, as presented in FIG. 16, illustrating a third step of installing the dual-tip straight pin for aiding in the assembly process.

Typical use of the dual-tip straight pin 40 is illustrated in FIGS. 14 and 15 and may be as was heretofore described with respect to use of the dual-tip straight pin 10 in FIGS. 6 through 9. Accordingly, the sharpened main shaft tip 15 of the main shaft 11 may initially be inserted in the assembly support workstation 32, adjacent to the assembly component first side surface 34 of the assembly component 33, with the transverse segment 25 of the pin leg 24 initially extending directly across the assembly component upper surface 36 of the assembly component 33 and the descending segment 27 of the pin leg 24 extending adjacent to the assembly component second, opposite side surface 35 of the assembly component 33, as indicated by the phantom lines in FIGS. 14 and 15. The dual-tip straight pin 40 may then be rotated about the longitudinal axis of the main shaft 11 by gripping and rotating the T-handle 16 until the descending segment 27 of the pin leg 24 engages the side surface 45 of the assembly component 33, as indicated by the solid lines in FIGS. 14 and 15. The dual-tip straight pin 40 is then pushed downwardly, typically by application of finger pressure to the upper surface 44 of the pinhead 41, such that the descending segment tip 28 on the descending segment 27 of the pin leg 24 extends downwardly into the assembly support workstation 32 until the transverse segment 25 of the pin leg 24 engages the assembly component upper surface 36 of the assembly component 33. Multiple dual-tip straight pins 40 may be secured in similar manner to secure the sections of assembly material 33 to the assembly support workstation 32 and in substantially aligned relationship to each other as adhesive applied to joints formed between the assembly component 33 dries.

An exemplary general application of the dual-tip straight pin 10, 40 would be for assembly of model airplane frame sections, generally referred to as a frame assembly 100 is illustrated in FIGS. 16 through 20. The exemplary frame assembly 100 comprises a series of frame ribs 110 placed in a parallel relationship to one another, a leading edge 140 assembled to a forward edge of each of the frame rib 110 and a trailing edge 142 assembled to a rear edge of each of the frame rib 110. Each frame rib 110 is fabricated having an airfoil-shaped profile. One or more assembly backbone aperture 112 is provided through the frame rib 110 to receive a frame spar 122. The assembly backbone aperture 112 is located through the frame rib 110 in accordance with proper engineering to adequately support the assembly during flight and landing. The assembly backbone aperture 112 of one frame rib 110 is located in registration with a respective assembly backbone aperture 112 of each adjacent frame rib 110. A series of assembly stringer slot 114 are formed in a spatial arrangement extending inward from an upper portion and a lower portion of a peripheral edge of each frame rib 110. Each assembly stringer slot 114 of one frame rib 110 is located in registration with a respective assembly stringer slot 114 of each adjacent frame rib 110. The front edges of the frame ribs 110 preferably form a plane for attachment of the leading edge 140 thereto. The rear edges of the frame ribs 110 preferably form a plane for attachment of the trailing edge 142 thereto. A frame spar 122 provides structural rigidity to the frame assembly 100. The frame spar 122 is inserted through the series of assembly backbone aperture 112. A backbone to rib interface 132 is defined as the intersection between the frame spar 122 and the assembly backbone aperture 112. At least one assembly stringer 124 is placed through each set of linearly arranged series of assembly stringer slots 114. A stringer to rib interface 134 is defined as the intersection between the assembly stringer 124 and the assembly stringer slot 114. The shape of the frame assembly 100 can vary between designs and applications, such as a fuselage, a wing, a stabilizer, an aileron, wing flaps, trim tabs, a rudder, and the like. Respectively, the shape and arrangement of the assembly stringer slots 114 can change. The shape of the frame assembly 100 can generate forces that counter a natural shape of the components, such as the assembly stringer slot 114, thus altering the components from the desired finished shape. By utilizing the dual-tip straight pins 10 as previously described, the dual-tip straight pins 10 retain the various components of the frame assembly 100 in position, thus retaining the components in the desired shape and location.

The components are fabricated of any suitable material, including balsawood, spruce, plastic, metal, and the like. The frame ribs 110 can be precut using a stamping machine such as a steel rule die, laser cutting, and the like. The leading edge 140 can be pre-shaped by the kit provider or shaped by the assembler. Similarly, the trailing edge 142 can be pre-shaped by the kit provider or shaped by the assembler. The frame spar 122 and assembly stringer 124 can be provided in predetermined lengths having the desired cross sectional shape.

Figure 19:
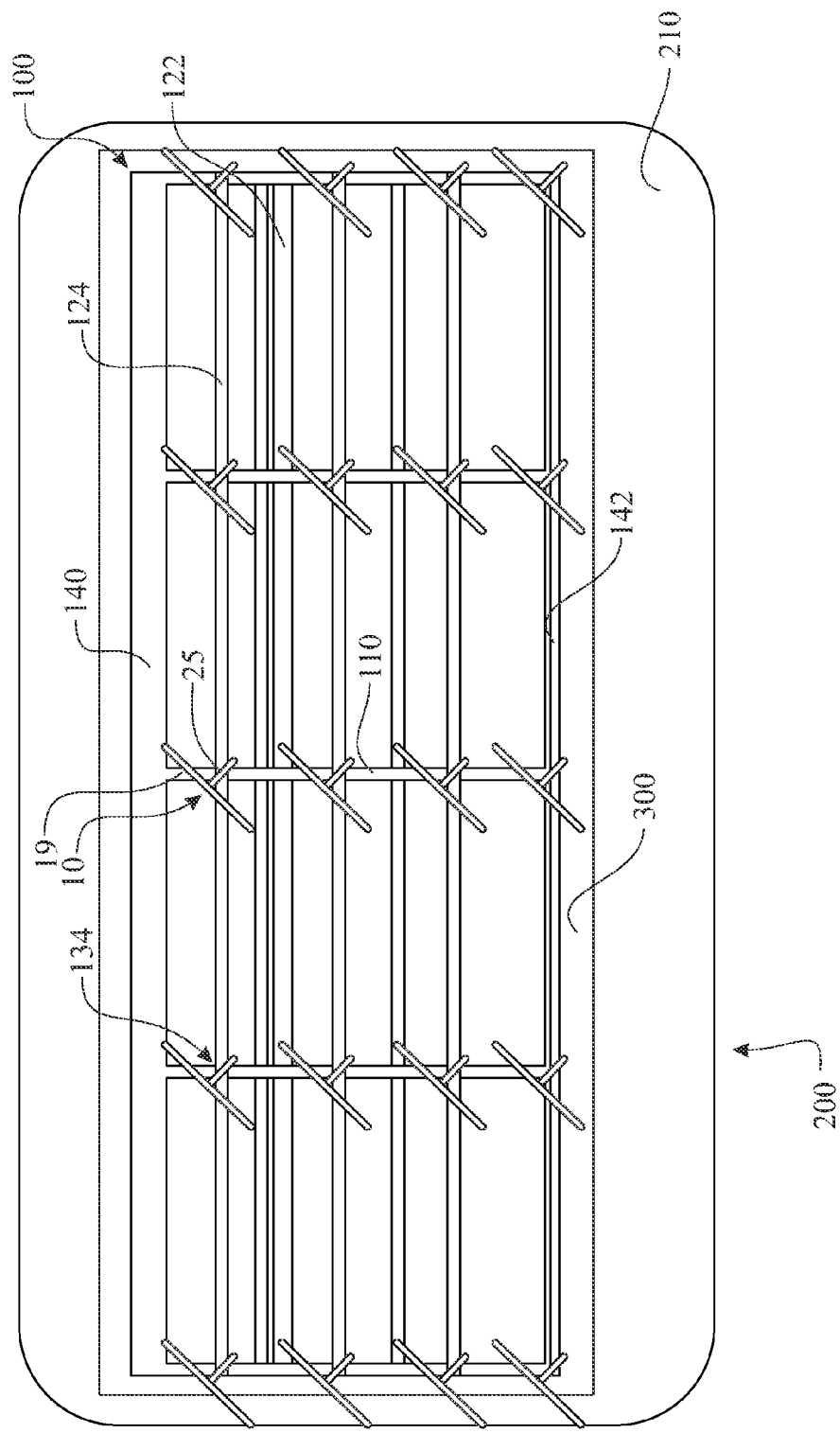
FIG. 19 presents a top plan view of the exemplary section of a model airplane, as presented in FIG. 16, illustrating a curing step of the assembly process.

Initiating assembly of the frame assembly 100, an assembly layout guide 300 comprising an assembly layout image 310 is placed upon a workstation assembly support surface 210 of an assembly support workstation 200. An optional non-stick barrier 320 can be placed covering the assembly layout guide 300 to avoid undesirable adhesion between the frame assembly 100 and the workstation assembly support surface 210. The non-stick barrier 320 can be wax paper, static cling wrap, aluminum foil, and the like. It is understood that it would be advantageous should the non-stick barrier 320 be fabricated of a translucent or transparent material, enabling visibility to the assembly layout image 310 placed thereunder. During assembly, the components are assembled and positioned in relation to one another using the assembly layout image 310 as a guide. Each dual-tip straight pin 10 is strategically positioned to temporarily retain the respective component in place. The tips 15, 28 of each dual-tip straight pin 10 are inserted into the assembly support workstation 200. The dual-tip straight pin 10 can be placed straddling a component or a joint (as shown). A plurality of dual-tip straight pins 10 can be placed utilizing, placing each dual-tip straight pin 10 in a manner covering each intersection or joint, wherein the dual-tip straight pin 10 retains the components in position, as shown in FIG. 19. Adhesive is applied to each joint formed between two intersecting components prior to, during, or after assembly. The frame assembly 100 is set aside, allowing the adhesive to cure. Once the adhesive is set or preferably cured, the plurality of dual-tip straight pins 10 are removed from the assembly support workstation 200. The frame assembly 100 is then assembled to other subassemblies to complete the end product.

Those skilled in the art can appreciate the application of the use of the dual-tip straight pins 10, 40 for the retention of components of any reasonably similar assembly. The dual-tip straight pin 10 can be placed straddling a joint, an individual component, and the like.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method of retaining two components together during an adhesive assembly process, the method comprising the steps of:
    obtaining at least one of dual-tip straight pin, said dual-tip straight pin comprising:
        an elongated main shaft comprising a midsection, said midsection dividing said main shaft into a main shaft upper segment and a main shaft lower segment, wherein said main shaft lower segment presents a circular cross section,
        a sharpened main shaft tip located at an insertion end of said main shaft lower segment,
        a grip handle located at an interface end of said main shaft upper segment,
        a pin leg comprising a transverse segment, a leg bend, and a descending segment,
        wherein said transverse segment extends substantially perpendicular from a midsection of said main shaft and terminates at a first end of said leg bend,
        wherein said descending segment extends from a second end of said leg bend in a direction parallel to said elongated main shaft and terminates at a sharpened descending segment tip, and
        wherein said sharpened main shaft tip and said sharpened descending segment tip are located at a same end of said dual-tip straight pin, and
        wherein said sharpened main shaft tip extends beyond said sharpened descending segment tip;
    placing said dual-tip straight pin straddling at least one of said first assembly component and said second assembly component, wherein said main shaft lower segment is placed proximate said respective assembly component first side surface, and inserting said main shaft lower segment into said assembly support workstation to a depth such that the descending segment tip extends below the assembly component upper surface of the straddled assembly component;
    rotating said partially inserted dual-tip straight pin about said main shaft by applying a rotational force to said grip handle until said pin leg descending segment contacts said respective assembly component second, opposite side surface, such that said transverse segment straddles said respective section of assembly material; and
    further inserting said dual-tip straight pin into said assembly support workstation until said transverse segment engages with said respective assembly component upper surface by applying a downward force to said grip handle.

2. A method of retaining two components together during an adhesive assembly process as recited in claim 1, the method further comprising a step of:
    applying an adhesive to an intersection formed between said first assembly component and said second assembly component.

3. A method of retaining two components together during an adhesive assembly process as recited in claim 2, the method further comprising the steps of:
    providing sufficient time for said adhesive to at least one of set and cure;
    removing said dual-tip straight pin from said assembly support workstation; and
    separating joined first assembly component and said second assembly component from said assembly support workstation.

4. A method of retaining two components together during an adhesive assembly process as recited in claim 1, the method further comprising the steps of:
    placing a non-stick barrier upon a workstation assembly support surface of said assembly support workstation; and
    placing said first assembly component and said second assembly component upon said non-stick barrier.

5. A method of retaining two components together during an adhesive assembly process as recited in claim 4, the method further comprising the steps of:
- applying an adhesive to an intersection formed between said first assembly component and said second assembly component;
- providing sufficient time for said adhesive to at least one of set and cure;
- removing said dual-tip straight pin from said assembly support workstation; and
- separating joined first assembly component and said second assembly component from said assembly support workstation.

6. A method of retaining two components together during an adhesive assembly process as recited in claim 1, the method further comprising the steps of:
- placing an assembly layout guide upon a workstation assembly support surface of said assembly support workstation, said assembly layout guide comprising an assembly layout image; and
- placing said first assembly component and said second assembly component upon said assembly layout guide, in registration with said assembly layout image.

7. A method of retaining two components together during an adhesive assembly process as recited in claim 6, the method further comprising the steps of:
- applying an adhesive to an intersection formed between said first assembly component and said second assembly component;
- providing sufficient time for said adhesive to at least one of set and cure;
- removing said dual-tip straight pin from said assembly support workstation; and
- separating joined first assembly component and said second assembly component from said assembly support workstation.

8. A method of retaining two components together during an adhesive assembly process as recited in claim 1, the method further comprising the steps of:
- placing an assembly layout guide upon a workstation assembly support surface of said assembly support workstation, said assembly layout guide comprising an assembly layout image;
- placing a translucent non-stick barrier upon said assembly layout guide; and
- placing said first assembly component and said second assembly component upon said translucent non-stick barrier.

9. A method of retaining two components together during an adhesive assembly process as recited in claim 8, the method further comprising the steps of:
- applying an adhesive to an intersection formed between said first assembly component and said second assembly component;
- providing sufficient time for said adhesive to at least one of set and cure;
- removing said dual-tip straight pin from said assembly support workstation; and
- separating joined first assembly component and said second assembly component from said assembly support workstation.

\* \* \* \* \*